UNITED STATES PATENT OFFICE.

JACOB BREDEL, OF HÖCHST-ON-THE-MAIN, GERMANY.

PROCESS FOR THE MANUFACTURE OF QUARTZ-GLASS FROM QUARTZ-SAND, &c.

No. 816,707.        Specification of Letters Patent.        Patented April 3, 1906.

Application filed September 19, 1904. Renewed August 30, 1905. Serial No. 276,477.

*To all whom it may concern:*

Be it known that I, JACOB BREDEL, a subject of the German Emperor, and a resident of Höchst-on-the-Main, Germany, have invented certain new and useful Improvements in Processes for the Manufacture of Quartz-Glass from Quartz-Sand, Silica, and the Like, of which the following is a specification.

This invention consists in a process for the manufacture of quartz-glass from quartz-sand, silica, and the like.

Heretofore quartz-glass has been made exclusively from rock-crystal, the latter in small pieces, before being fused, being heated up to about 1,000° centigrade and then quickly cooled in water. By repeating this treatment several times a substance with a very small coefficient of expansion is obtained.

Were quartz-sand, silica, or the like employed as the raw material in place of rock-crystal, and this in as pure a state as possible, treated as above described, the end in view—viz., the production of a glass which is practically unaffected by changes of temperature—would not be attained, and, further, on fusion of the sand a great number of air-bubbles would be formed.

Quartz-glass possessing the same properties as glass made from rock-crystal can be manufactured from quartz-sand, silica, and the like by my process, which consists in fusing the raw material at an appropriate temperature into a cohesive mass, cooling said mass, and then breaking it up into small pieces, followed by subsequent treatment exactly as with rock-crystal.

Having now fully described my said invention, what I claim, and desire to secure by Letters Patent, is—

A process for the manufacture of quartz-glass from quartz-sand, silica and the like, consisting in melting the raw material into a cohesive mass which, on cooling, is broken up into small pieces which are several times heated up to a high temperature and then quickly cooled in water, whereby, in the subsequent fusing operation, the formation of air-bubbles in the glass is obviated, and a glass, practically unaffected by changes of temperature, is obtained.

In testimony whereof I have hereunto set my hand in presence of two witnesses.

JACOB BREDEL.

Witnesses:
    JEAN GRUND,
    CARL GRUND.